United States Patent
Morgan

(10) Patent No.: US 11,106,832 B1
(45) Date of Patent: Aug. 31, 2021

(54) SECURE COMPUTE DEVICE HOUSING WITH SENSORS, AND METHODS AND SYSTEMS FOR THE SAME

(71) Applicant: MANAGEMENT SERVICES GROUP, INC., Virginia Beach, VA (US)

(72) Inventor: Thomas S. Morgan, Virginia Beach, VA (US)

(73) Assignee: Management Services Group, Inc., Virginia Beach, VA (US)

(*) Notice: Subject to any disclaimer, the term of this patent is extended or adjusted under 35 U.S.C. 154(b) by 0 days.

(21) Appl. No.: 16/935,994

(22) Filed: Jul. 22, 2020

Related U.S. Application Data

(60) Provisional application No. 62/955,791, filed on Dec. 31, 2019.

(51) Int. Cl.
| | |
|---|---|
| *G06F 21/81* | (2013.01) |
| *G06F 1/18* | (2006.01) |
| *G08B 13/22* | (2006.01) |
| *G01D 21/02* | (2006.01) |
| *G01P 13/00* | (2006.01) |

(52) U.S. Cl.
CPC ............ *G06F 21/81* (2013.01); *G01D 21/02* (2013.01); *G01P 13/00* (2013.01); *G06F 1/181* (2013.01); *G08B 13/22* (2013.01)

(58) Field of Classification Search
CPC ...................................................... G06F 21/81
USPC ........................................................ 726/36
See application file for complete search history.

(56) References Cited

U.S. PATENT DOCUMENTS

| | | | | |
|---|---|---|---|---|
| 5,966,081 A * | 10/1999 | Chesnutt | ............... | G06F 21/88 307/10.3 |
| 6,853,093 B2 * | 2/2005 | Cohen | .................. | H01L 23/576 257/678 |
| 7,271,561 B2 | 9/2007 | Chen et al. | | |
| 7,370,242 B2 | 5/2008 | Chen et al. | | |
| 7,726,144 B2 | 6/2010 | Larson et al. | | |
| 7,818,096 B2 | 10/2010 | Dooley | | |
| 8,321,163 B2 | 11/2012 | Ewing et al. | | |
| 8,593,824 B2 * | 11/2013 | Kirmayer | ............... | G06F 21/86 361/760 |
| 8,904,383 B2 | 12/2014 | Bash et al. | | |
| 9,071,046 B2 | 6/2015 | Stevens et al. | | |
| 9,164,519 B2 * | 10/2015 | Holloway | .............. | G05D 27/02 |
| 9,665,870 B1 * | 5/2017 | Rezayee | ................ | G06F 21/88 |

(Continued)

FOREIGN PATENT DOCUMENTS

JP        2019018674 A        2/2019

*Primary Examiner* — Harris C Wang
(74) *Attorney, Agent, or Firm* — Cooley LLP

(57) ABSTRACT

In some embodiments, a method can include measuring, via a sensor disposed within an interior of a housing, an out-of-band characteristic of an electronic circuit disposed within the interior of the housing. The method can further include receiving, from the sensor and at a management circuit disposed within the interior of housing, a sensor signal indicating the out-of-band characteristic of the electronic circuit. The method can further include analyzing, at the management circuit, the out-of-band characteristic of the electronic circuit to produce an alarm signal. The method can further include sending, from the management circuit, the alarm signal to initiate a remedial action in response to receiving the alarm signal.

21 Claims, 3 Drawing Sheets

300

Measure, via a sensor disposed within an interior of a housing, an out-of-band characteristic of a first electronic circuit disposed within the interior of the housing and not of a second circuit disposed within the interior of the housing 301

↓

Receive, from the sensor and at a management circuit disposed within the interior of housing, a sensor signal indicating the out-of-band characteristic of the first electronic circuit and not substantially a sensor signal indicating the out-of-band characteristic of the second electronic circuit 302

↓

Analyze, at the management circuit, the out-of-band characteristic of the first electronic circuit to produce an alarm signal 303

↓

Send, from the management circuit, the alarm signal to initiate a remedial action in response to receiving the alarm signal 304

(56) References Cited

U.S. PATENT DOCUMENTS

| | | |
|---|---|---|
| 9,716,351 B2 | 7/2017 | Lu |
| 9,785,208 B2 | 10/2017 | Lovicott et al. |
| 10,117,360 B2 | 10/2018 | Crawford |
| 10,365,168 B2 | 7/2019 | Ban |
| 10,372,185 B2 | 8/2019 | Lester et al. |
| 10,419,540 B2 | 9/2019 | Arora et al. |
| 10,433,455 B2 | 10/2019 | Jansen et al. |
| 10,462,641 B2 | 10/2019 | Baldree |
| 10,499,540 B2 | 12/2019 | North et al. |
| 10,519,586 B2 | 12/2019 | Jeon et al. |
| 10,564,686 B2 | 2/2020 | Lee et al. |
| 2009/0085737 A1* | 4/2009 | Estevez ................ H04M 1/724 340/531 |
| 2009/0268909 A1* | 10/2009 | Girao .................... H04W 12/08 380/259 |
| 2013/0235544 A1* | 9/2013 | Tucker .............. H01L 23/49833 361/783 |
| 2015/0192637 A1* | 7/2015 | Falk ...................... H04L 9/3278 326/16 |
| 2017/0116440 A1* | 4/2017 | Huang ................ G06F 21/6218 |
| 2017/0300141 A1 | 10/2017 | Inoue et al. |
| 2018/0262043 A1 | 9/2018 | Yi et al. |
| 2018/0316082 A1 | 11/2018 | Keller, III |
| 2018/0348828 A1 | 12/2018 | Cavallaro et al. |
| 2019/0339684 A1 | 11/2019 | Cella et al. |
| 2020/0026253 A1* | 1/2020 | Fuhr .................... H04L 9/3297 |
| 2020/0260226 A1* | 8/2020 | Moeller ............. G07C 9/00817 |

\* cited by examiner

300

Measure, via a sensor disposed within an interior of a housing, an out-of-band characteristic of a first electronic circuit disposed within the interior of the housing and not of a second circuit disposed within the interior of the housing 301

Receive, from the sensor and at a management circuit disposed within the interior of housing, a sensor signal indicating the out-of-band characteristic of the first electronic circuit and not substantially a sensor signal indicating the out-of-band characteristic of the second electronic circuit 302

Analyze, at the management circuit, the out-of-band characteristic of the first electronic circuit to produce an alarm signal 303

Send, from the management circuit, the alarm signal to initiate a remedial action in response to receiving the alarm signal 304

FIG. 3

SECURE COMPUTE DEVICE HOUSING WITH SENSORS, AND METHODS AND SYSTEMS FOR THE SAME

CROSS REFERENCE TO RELATED APPLICATION

This application claims priority to and the benefit of U.S. Patent Application No. 62/955,791, filed Dec. 31, 2019 and entitled "Modular Embedded Secure Chassis," which is incorporated herein by reference in its entirety.

TECHNICAL FIELD

The present disclosure relates to the field of computers/digital processing systems, and in particular to methods and apparatus related to a compute device housing, in which secure operation of electronic circuits can be managed by sensor signals.

BACKGROUND

Known computers or embedded computers can be affected by interruptions that occur due to factors such as, for example, physical tampering, thermal stress, electromagnetic noise, physical tampering, and/or the like. Thus, a need exists for a housing of computers or embedded computers that allows for improvement of security for the computers or the embedded computers that can be affected by performance degradation and/or interrupting factors.

SUMMARY

In some embodiments, a method can include measuring, via a sensor disposed within an interior of a housing, an out-of-band characteristic of a first electronic circuit disposed within the interior of the housing. The method can further include receiving, from the sensor and at a management circuit disposed within the interior of housing, a sensor signal indicating the out-of-band characteristic of the first electronic circuit. The method can further include analyzing, at the management circuit, the out-of-band characteristic of the first electronic circuit to produce an alarm signal. The method can further include sending, from the management circuit, the alarm signal to initiate a remedial action in response to receiving the alarm signal.

BRIEF DESCRIPTION OF THE DRAWINGS

FIG. 3 is a flowchart of a method for operating a secure electronic device housing system, according to an embodiment.

DETAILED DESCRIPTION

Non-limiting examples of various aspects and variations of the embodiments are described herein and illustrated in the accompanying drawings.

One or more embodiments described herein generally relate to methods, apparatus, and systems that use a set of sensor signals to a set of electronic circuits within a secure electronic device housing (chassis) systems. Generally electronic devices, ranging from small embedded electronic devices to large electronic systems, can undergo a tampering event. Such tampering events that the electronic devices may experience can be managed using the secure electronic device housing system described herein.

Described herein are examples of secure electronic device housings that are suitable for highly reliable and secure computing systems. One or more of the secure electronic device housings described herein provide methods, apparatus, and systems for high performing electronic devices to operate over a wide range of external factors such as tampering events and/or environmental factors. One or more of the secure electronic device housings described herein include at least one electronic device that manages operation of a set of electronic circuits based on signals received from a set of sensors. As such, the set of compute devices described herein do not complete a power-on cycle without a validity check based on a set of out-of-band characteristics of the set of electronic circuits.

Figure 1:
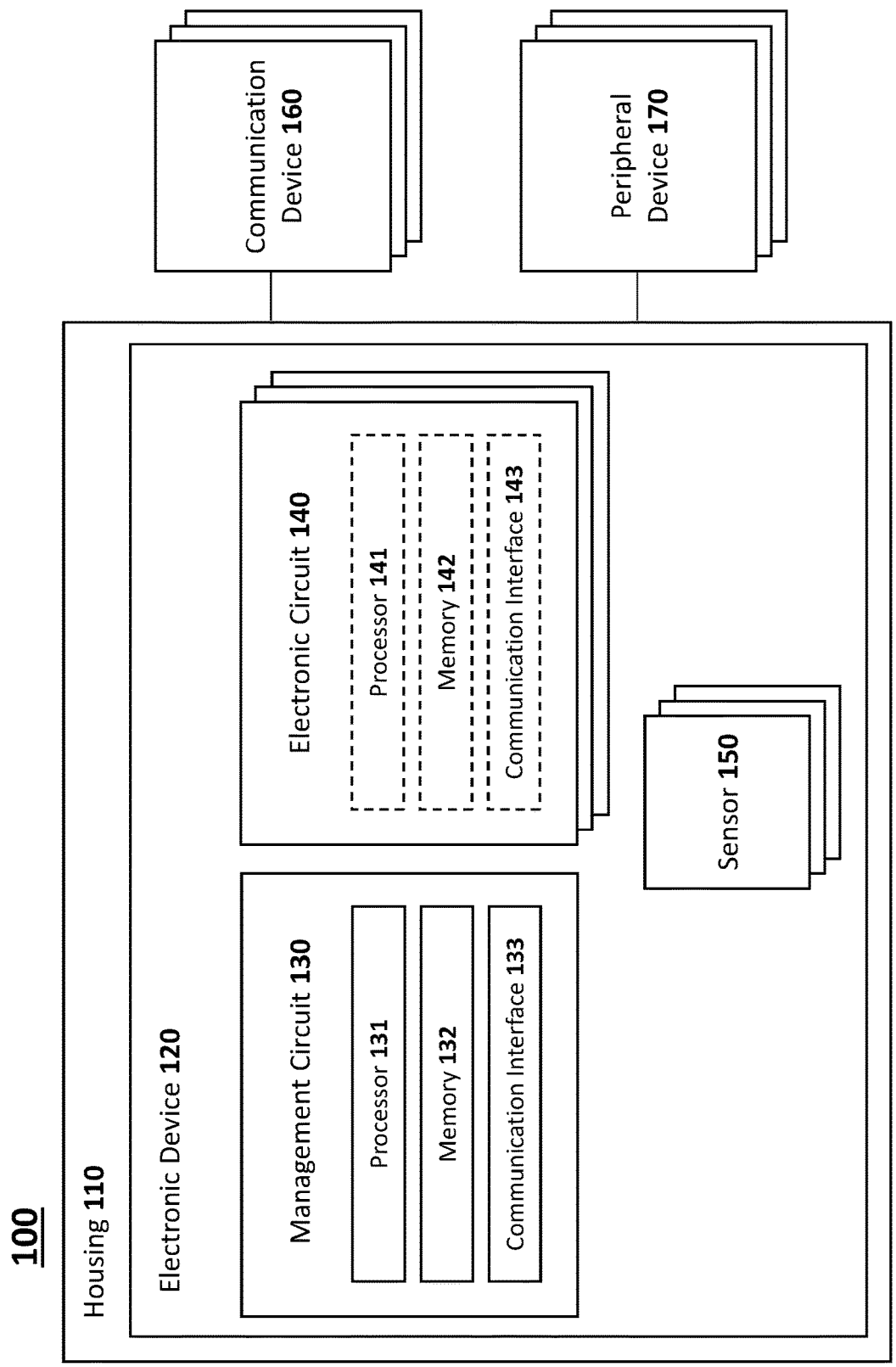
FIG. 1 is a block diagram that illustrates a secure electronic device housing system, according to an embodiment.

FIG. 1 is a block diagram that illustrates a secure electronic device housing system 100, according to an embodiment. The secure electronic device housing system 100 includes a housing 110 that helps to protect and/or house various electronic components that make up the secure electronic device housing system 100.

The housing 110 includes an electronic device 120 within the interior of the housing 110 and can include additional electronic components such as for example, a cooling fan, a thermal management device, a power supply, and/or the like (not shown). The electronic device 120 includes a management circuit 130, a set of electronic circuits 140 (referred to herein individually as an "electronic circuit 140" and collectively as a "set of electronic circuits 140"), and a set of sensors 150. Although the set of electronic circuits 140 are shown as multiple electronic circuits, in some embodiments a single electronic circuit 140 is possible. The set of electronic circuits 140 can be operatively coupled to the management circuit 130 to receive a set of alarm signals (e.g., a set of electrical signals, a set of electromagnetic signals, and/or the like) from the management circuit 130 but not receive electrical signals from the management circuit 130. In some examples, the management circuit can be electrically isolated from the set of electronic circuits 140 in one direction (i.e., not a significant net amount of electrical current flowing from the set of electronic circuit 140 to the management circuit 130) using a non-reciprocal electrical component (e.g., a diode). The set of electronic circuits 140 are not connected (without intervening components) to any of the set of sensors 150 (referred to herein individually as a "sensor 150" and collectively as a "set of sensors 150"). The set of sensors 150 can be selectively and operatively coupled (e.g., via a switch) to the management circuit 130. In some implementations, the host board 110 can be a host board (e.g., a motherboard; not shown) that hosts various electronic components (e.g., the management circuit 130, the set of circuits 130, the set of sensors 150, and/or the like) of the secure electronic device housing system 100. The electronic device 120 of the housing 110 can be communicatively and/or operatively coupled to a set of communication devices 160 and a set of peripheral devices 170 situated outside the interior of the housing 110.

The management circuit 130 is an electronic hardware disposed within the interior of the housing 110 that can manage operation of various components of the secure electronic device system 100. The management circuit 130 does not receive electrical signals from any of the set of electronic circuits 140. The management circuit 130 includes a processor 131, a memory 132, and a communication interface 133. The processor 131, the memory 132, and the communication interface 133 are connected (without intervening components) or coupled (with or without intervening components) to each other. The management circuit 130 can receive from the set of sensors 150 a set of sensor signals (e.g., an electrical signal(s), an electromagnetic signal(s), and/or the like) indicating a set of out-of-band characteristics of one or more electronic circuits 140. The management circuit 130 can send a set of alarm signals (e.g., a set of electromagnetic signals, a set of optical signals, a set of electrical signals, and/or the like) to the one or more electronic circuits 140, a set of sensors, and/or the set of communication devices 160, based on the set of out-of-band characteristics of the one or more electronic circuits 140. In response to the set of alarm signals, the management circuit 130 can for example prevent the one or more electronic circuits 140 from completing a power-on cycle until the management circuit 130 has performed a validity check based on the set of out-of-band characteristics of the one or more electronic circuits 140.

The validity check performed by the management circuit 130 can involve checking that the one or more electronic circuits 140 are authorized/permitted equipment. In one example, the management circuit 130 prompts a user of the secure electronic device housing system 100 to confirm that the one or more circuits 140 are authorized/permitted equipment. In another example, the management circuit 130 can receive security-related information (e.g., authorization code) from the one or more circuits 140 and perform an authorization based on that information. In some instances, the validity check can involve checking that the one or more electronic circuits 140 are compatible and/or operational with the electronic device 120. In one example, the management circuit 130 checks the make, model, and/or electrical specifications of the electronic circuit 140 to confirm whether the electronic circuit is compatible and/or operational with the electronic device 120 (and/or specific devices/circuits within the electronic device 120).

The processor 131 can include, for example, a general purpose processor, a central processing unit (CPU), an application specific integrated circuit (ASIC), a field programmable gate array (FPGA), an accelerated processing unit (APU), a programmable logic controller (PLC), a graphics processing unit (GPU), a microcontroller, and/or the like. The processor 131 can be operatively coupled to the memory 132 and/or the communication interface 133 through a system bus (e.g., address bus, data bus, and/or control bus, not shown).

The memory 132 can include electronic circuitry, a magnetic disk, and/or an optically encoded disk that can be configured to be operatively coupled to the processor 131. The memory 132 can include, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 132 can store and/or include a set of software, and/or a set of firmware that includes instructions to cause a processor (such as the processor 131), to perform procedures such as, for example, control procedures, arithmetic procedures, and/or logical procedures.

The communication interface 133 can enable the management circuit 130 to communicate with (e.g., send data to and/or receive data from) the set of sensors 150, the set of electronic circuits 140, the set of communication devices 160, and/or the set of peripheral devices 170. In some implementations, the communication interface 133 can include and/or enable, for example, a network interface controller (NIC), wireless connection, a wired port, and/or the like. In some implementations, the communication interface 133 can establish and/or maintain a communication session between the electronic device 120 and another device (e.g., via a computer network or the internet, not shown). Similarly stated, the communication interface 133 can enable the electronic device 120 of the housing 110 to send data to and/or receive data from another device (e.g., the set of communication devices 160, and/or the set of peripheral devices 170). The communication interface 133 can be operatively coupled to the processor 131 and/or the memory 132.

The set of electronic circuits 140 can include a set of electronic circuitry that is disposed within the interior of the housing 110 and that can provide at least one specialized function such as, for example, computing, graphic processing, storage, and/or the like. The set of electronic circuits 140 can be or include, for example, an application-specific integrated circuit (ASIC), a field-programmable gate array (FPGA), a high bandwidth memory (HBM), and/or the like. In some implementations, each electronic circuit 140 can have multiple functions such as, for example, a computing and storage, storage and networking, and/or the like.

In some implementations, the set of electronic circuits 140 can include an ASIC or printed wiring board (PWC) or printed circuit board (PCB) that includes an ASIC (hereafter an "ASIC board"). Such an ASIC can include electronic circuitry enabling specialized applications. In one example, an ASIC board can include active electronic components (e.g., transistor, diffused layers, switches, and/or the like) in predefined locations of the ASIC board and prior to a metallization step (i.e., electrically connecting active electronic components). Thereafter, a user of the ASIC can close and/or open active electronic components to cause the ASIC to behave in a customized way. In some implementations, the set of electronic circuits 140 can include an FPGA. The FPGA includes a set of logic blocks connected via programmable interconnects that are configurable to perform a first customized task (e.g., a neural network task) and reconfigurable at a later time to perform a second customized task. In some implementations, the set of electronic circuits 140 can include an HBM. The HBM uses a vertical stack of memory dies (e.g., by through-silicon via) for higher operation bandwidth and less power consumption compared to single die dynamic random-access memory (DRAM).

Each electronic circuit from the set of electronic circuits 140 has or can demonstrate a set of out-of-band characteristics that can be measured by a physically separate sensor. Although the set of out-of-band characteristics of the set of electronic circuits 140 can be measured during operation of the set of electronic circuits 140, it is possible that the set of electronic circuits 140 has or can demonstrate a set of out-of-band characteristics that can be measured when the set of electronic circuits 140 are not operating. The set of out-of-band characteristics of the set of electronic circuits 140 can include physical characteristics of the set of electronic circuits 140 (e.g., a set of byproducts of the set of electronic circuits 140) that do not carry information about the data that can for example be processed, stored, and/or communicated by the set of electronic circuits 140. The set of out-of-band characteristics, however, may include information about a medium (e.g., beam of light, electric current, wired medium (e.g., optical fibers or PCB tracks/pads), wireless medium, etc.) that carries the data. In other words, although the data processed, stored, and/or communicated by the set of electronic circuits 140 may not be recovered based on the set of out-of-band characteristics, in some instances, the set of out-of-band characteristics can provide an assessment of the medium carrying the data (e.g., medium bandwidth, medium current carrying capacity, medium impedance, and/or the like). For example, the quality of light carrying the data within an optical transport medium (e.g., an optical fiber) is monitored as an out-of-band characteristic, but the quality of the usable data bandwidth within the optical transport medium (i.e., from the perspective of data-related performance) is an in-band characteristic. For another example, the dispersion of an optical fiber (that transports photons representing data) is an out-of-band characteristic, particularly when the dispersion is greater than a predefined dispersion tolerance for the optical fiber, but the dropping of data packets is an in-band characteristic.

In addition/alternatively, in some instances, the set of out-of-band characteristics can include a movement, a speed, an acceleration, a temperature, a pressure, an out-of-band mechanical vibration, an out-of-band light intensity, an out-of-band RF signal, and/or the like of the set of electronic circuits 140. For example, the temperature of an electronic processing unit can be monitored as an out-of-band characteristic. In another example, pressure inside a crystalline semiconductor of a laser can be monitored as an out-of-band characteristic.

Each electronic circuit from the set of electronic circuits 140 can include a processor 141, a memory 142, and/or a communication interface 143 that are structurally and functionally similar to the processor 131, the memory 132, and the communication interface 133, respectively. The processor 141, the memory 142, and/or the communication interface 143 are separate from and not sending electrical signals to the processor 131 of the management circuit 130. On the other hand, the processor 131 of the management circuit 130 can send a set of alarm signals to the processor 141 of the electronic circuit 140.

The set of sensors 150 can include a set of electronic, photonic, and/or micro electromechanical system (MEMS) devices disposed within the interior of the housing 110. The set of sensors 150 can include, for example, a seismic sensor, a thermal sensor, an accelerometer, a gyroscopic sensor, a magnetometer, a proximity sensor, a light sensor, a barometric sensor or a radio frequency (RF) sensor. Each sensor from the set of sensors 150 have a sensor type and can measure at least one out-of-band characteristic of an electronic circuit from the set of electronic circuits 140. In addition to a sensor type, each sensor 150 can also have a position, a distance, and/or a direction relative to each electronic circuit 140. The position, the distance, and/or the direction of each sensor 150 can be a deterministic factor for obtaining a measurement value from each circuit 140. The position, the distance, and/or the direction of each sensor 150 can determine the measurement value of the sensor 150 is more reflective of a particular electronic circuit 140 than the remaining electronic circuits 140 and/or than the average/overall measurement value for the housing interior. Each sensor can be operatively coupled to the management circuit 130 and can generate a set of sensor signals (associated with the sensor) that are sent to the management circuit 130.

In one example, a first sensor 150 can be a thermal sensor that has a distance $d_1$ from a first circuit 140 and has a distance $d_2$ from a second circuit 140. The distance $d_1$ is significantly smaller than the distance $d_2$ (e.g., by a factor of 1 to 10, by a factor of 1 to 100, and/or the like) which results in the sensor 150 to obtain a measurement value of temperature from the first electronic circuit 140 and not (or significantly less) from the second electronic circuit 140. A location of a thermal sensor in the housing can also be a deterministic factor in obtaining measurement values of temperature. In another example, the housing can have an air intake, air exhaust, and a fan in between the air intake and the air exhaust. The fan can be configured to generate air-flow across one or more circuits from the set of circuits 140. A first thermal sensor located at the air exhaust side of the electronic device 120 can obtain a more accurate measuring of a temperature of the first circuit 140 located at the air exhaust side of the electronic device 120 than a second thermal sensor located at the air intake side of the electronic device 120 measuring a temperature of the first circuit 140 or the second circuit 140 located at the air intake side of the electronic device 120. In another example, a second sensor 150 can be a light sensor that has a field of view with a center in a direction $t_1$ from a third circuit 140 and in a direction $t_2$ from a fourth circuit 140. The direction $t_1$ is normal to a plane of incidence of light form the third circuit 140. The direction $t_2$ is oblique to a plane of incidence of light from the fourth circuit 140. As a result, the sensor 150 obtains a light intensity measurement value from the third electronic circuit 140 and not (or significantly less) from the fourth electronic circuit 140. In yet another example, a third sensor 150 can be an RF sensor at a position pi that is on one side close to transmitter of a WiFi™ module of a fifth electronic circuit 140 and on the other side close to an electromagnetic interference (EMI) gasket of a sixth electronic circuit 140. As a result, the sensor 150 picks up an RF signal measurement value from the fifth circuit 140 and not (or significantly less) from the sixth circuit 140. In yet another example, a seventh electronic circuit 140 can be on a first circuit board and an eighth electronic circuit 140 can be on a second circuit board. A fourth sensor 150 can be a thermal sensor located on the first circuit board (and disposed about the seventh electronic circuit 140 on that board) but not on the second circuit board. As a result, the thermal sensor measures more temperature variation of the seventh electronic circuit 140 on the first circuit board than the eighth electronic circuit 140 on the second circuit board. This is partially because the first circuit board and/or the second circuit board can act as thermal shields (the same logic can apply to RF sensor, light sensor, and/or the like).

In some embodiments, the management circuit 130 can include a switch (not shown) that is operatively coupled to the processor 131 of the management circuit 130 and the set of sensors 150 of a set of sensor types such as, for example, a seismic sensor, a thermal sensor, an accelerometer, a gyroscopic sensor, a magnetometer, a proximity sensor, a light sensor, a barometric sensor or an radio frequency (RF) sensor. The processor 131 of the management circuit 130 can be configured to selectively and operatively couple, via the switch, to a sensor from the set of sensors and not the remaining sensors from the set of sensors. In one example, the switch can be an electrical switch that electrically connects the processor 131 of the management circuit 130 and the sensor 150. In one example, the switch can be an electromagnetic relay that electromagnetically connects the processor 131 of the management circuit 130 and the sensor 150. In one example, the sensor 150 can include a communication interface (not shown) that transmit signals from/to the switch that is in turn operatively coupled to the processor 131 of the management circuit 130.

In some embodiments, the management circuit 130 includes a processor 131 separate from and not receiving electrical signals from a processor 141 of an electronic circuit from the set of electronic circuits 140. The management circuit 130 includes a switch (not shown) that is operatively coupled to the processor 131 of the management circuit 130, a first sensor 150 of a first type, and a second sensor 150 of a second type different from the first type. The first sensor 150 and the second sensor 150 can include at least two of a seismic sensor, a thermal sensor, an accelerometer, a gyroscopic sensor, a magnetometer, a proximity sensor, a light sensor, a barometric sensor or a radio frequency (RF) sensor, and/or the like. The switch can selectively and operatively couple the processor 131 and the first sensor 150 at a first time period, and not couple the processor 131 and the second sensor 150 at the first time period. The switch can selectively and operatively couple the processor 131 and the second sensor 150 at a second time period mutually exclusive from the first time period, and not couple the processor 131 and the first sensor 150 at the second time period. The management circuit 130 receives a first sensor signal from the first sensor 150 and a second sensor signal from the second sensor 150. Upon receipt of the first sensor signal and the second sensor signal, the management circuit 130 sends an alarm signal (e.g., an electromagnetic signals, an optical signal, an electrical signal, and/or the like) to the electronic circuit 140 (e.g., to the processor 141 of the electronic circuit) and/or the set of communication devices 160.

The set of communication devices 160 can be outside the interior of the housing 110 and can be communicatively and/or operatively coupled to electronic device 120 of the housing 110. The one or more communication devices 160 can receive an alarm signal from the management circuit 130 in response to an interruption due to external factors such as, for example, thermal stress, electromagnetic noise, physical tampering, and/or the like. The one or more communication devices 160 can initiate a remedial action in response to receiving the alarm signal. In one example, the remedial action can include halting an operating system running on the processor 131 of the management circuit and/or the processor 141 of the electronic circuit 140 of the secure electronic device housing system 100 and requiring a verification action from an authorized user and/or manufacturer of the secure electronic device housing system 100 for unlocking the secure electronic device housing system 100. In one example, the remedial action can include generating a warning message (e.g., by generating a sound, by sending a text message, and/or the like) for attention of a user of the secure electronic device housing system 100. In one example, the remedial action can include full or partial disablement of the electronic device 120 of the secure electronic device housing system 100. In one example, the remedial action can include turning on a thermal management device (not shown), activating a faraday cage (now shown), and/or turning on a vibration isolation system (not shown).

The set of peripheral devices 170 can be operatively coupled to the electronic device 120 of the housing 110. The set of peripheral devices 170 can be set of ancillary devices used to input information to the secure electronic device housing system 100 or output information from the electronic device 120 from the secure electronic device housing system 100. The set of peripheral devices 170 can include, for example, one or more of a keyboard(s), a mouse(s), a monitor(s), a webcam(s), a microphone(s), a touch screen(s), a printer(s), a scanner(s), a virtual reality (VR) head-mounted display, a speaker(s), a headphone(s), a game-pad(s), a joystick(s), a biometric reader(s), and/or the like (not shown).

As shown in FIG. 1, a secure electronic device housing system 100 includes a housing 110. The housing 110 includes an interior containing an electronic device 120 disposed in the interior of the housing 110. The electronic device 120 is communicatively and/or operatively coupled to a set of communication device 160 and a set of peripheral devices 170. An electronic device 120 of the housing 110 includes a set of electronic circuits 140 that are disposed within the interior of the housing 110. The electronic device 120 includes a set of sensors 150 (e.g., a seismic sensor, a thermal sensor, an accelerometer, a gyroscopic sensor, a magnetometer, a proximity sensor, a light sensor, a barometric sensor or a radio frequency (RF) sensor, and/or the like) separate from and not electrically connected to any of the set of electronic circuits 140. The electronic device 120 also includes a management circuit 130 not receiving electrical signals from the set of electronic circuits 140. The management circuit 130, the set of electronic circuits 140, and the set of sensors 150 are disposed within the interior of the housing 110. Each sensor 150 is configured to measure an out-of-band characteristic from a set of out-of-band characteristics and of an electronic circuit and not of the other electronic circuits from the set of electronic circuits 140. Each sensor 150 sends a set of sensor signals (e.g., a set of electrical signals, a set of electromagnetic signals, and/or the like) indicating the out-of-band characteristics of the electronic circuit 140. The management circuit 130 is configured to receive the set of sensor signals from each sensor 150. The management circuit 130 is configured to send an alarm signal, based on the set of out-of-band characteristics of the electronic circuit 140, to the electronic circuit 140 and/or the set of communication devices 160. The management circuit 130 can prevent the electronic circuit 140 from completing a power-on-cycle until the management circuit 130 has performed a validity check based on the set of out-of-band characteristics of the electronic circuit 140. The set of communication devices 160 can initiate a remedial action in response to receiving the alarm signal.

In some instances, a sensor from the set of sensors 150 is at least one of a seismic sensor, an accelerometer sensor, or gyroscopic sensor. An out-of-band characteristic of an electronic circuit from the set of electronic circuits 140 is a movement of the electronic device 120. The management circuit 130 sends the alarm signal based on the movement of the electronic device 120. The electronic circuit can become inoperative or powered down (e.g., standby, shut down) in response to the alarm signal indicating the movement of the electronic device 120.

In some implementations, an electronic device 120 can include a first electronic circuit from a set of electronic circuits 140 and a second electronic circuit from the set of electronic circuits 140. The first electronic circuit 140 and the second electronic circuit 140 are disposed within the interior of the housing 110. The electronic device 120 can include a set of sensors 150 separate from and not electrically connected to any of the first electronic circuit 140 and the second electronic circuit 140. Each sensor from the set of sensors 150 is configured to measure an out-of-band characteristic from a set of out-of-band characteristics and of the first electronic circuit 140 and, in some embodiments, substantially not measuring the second electronic circuit 140. The term "substantially not measuring" in this context can mean that a measured value of an out-of-band characteristic of the second electronic circuit is significantly less than the measured value of the out-of-band characteristic of the first electronic circuit, such as 10% less, or 5% less or 1% less. Alternatively, in some embodiments, the term "substantially not measuring" in this context can mean that to the extent that an out-of-band characteristic of the second electronic circuit is included within or affects the measurement of the out-of-band characteristic of the first electronic circuit, the out-of-band characteristic of the second electronic circuit does not affect whether an alarm condition is met based on the out-band characteristics of the first electronic circuit. The electronic device 120 can include a management circuit 130 separate from and not receiving electrical signals from any of the first electronic circuit 140 and the second electronic circuit 140. The management circuit 130 receives from the set of sensors 150 a set of sensor signals indicating the set of out-of-band characteristics of the first electronic circuit 140. The management circuit 130 sends an alarm signal based on the plurality of out-of-band characteristics of the first electronic circuit 140.

In one example, a sensor from the set of sensors 150 can receive a set of thermal characteristics of an electronic circuit from the set of electronic circuits 140 indicating unusual heat in the electronic circuit 140. The management circuit 130 can then send a set of electromagnetic signals (as a set of alarm signals) to the electronic circuit 140 based on the set of thermal characteristics of the electronic circuit 140. The management circuit 130 can further prevent the electronic circuit 140 from completing a power-on-cycle until a validity check is performed by an authorized user of the secure electronic device housing system 100.

In one example, a first sensor from the set of sensors 150 can receive a set of movement characteristics of a first electronic circuit from the set of electronic circuits 140 indicating unusual mechanical vibration in the first electronic circuit 140. At the same time, a second sensor from the set of sensors 150 can receive a set of optical characteristics of a second electronic circuit from the set of electronic circuits 140 indicating unusual light intensity in the second electronic circuit 140. The management circuit 130 can then send a set of electrical signals (as a set of alarm signals) to the set of communication devices 160 based on the set of movement characteristics of the first electronic circuit 140 and/or based on the set of optical characteristics of the second electronic circuit 140. The set of communication devices 160 can initiate a set of remedial actions including sounding an alarm and/or powering down the secure electronic device housing system 100 until a validity check is performed.

Figure 2:
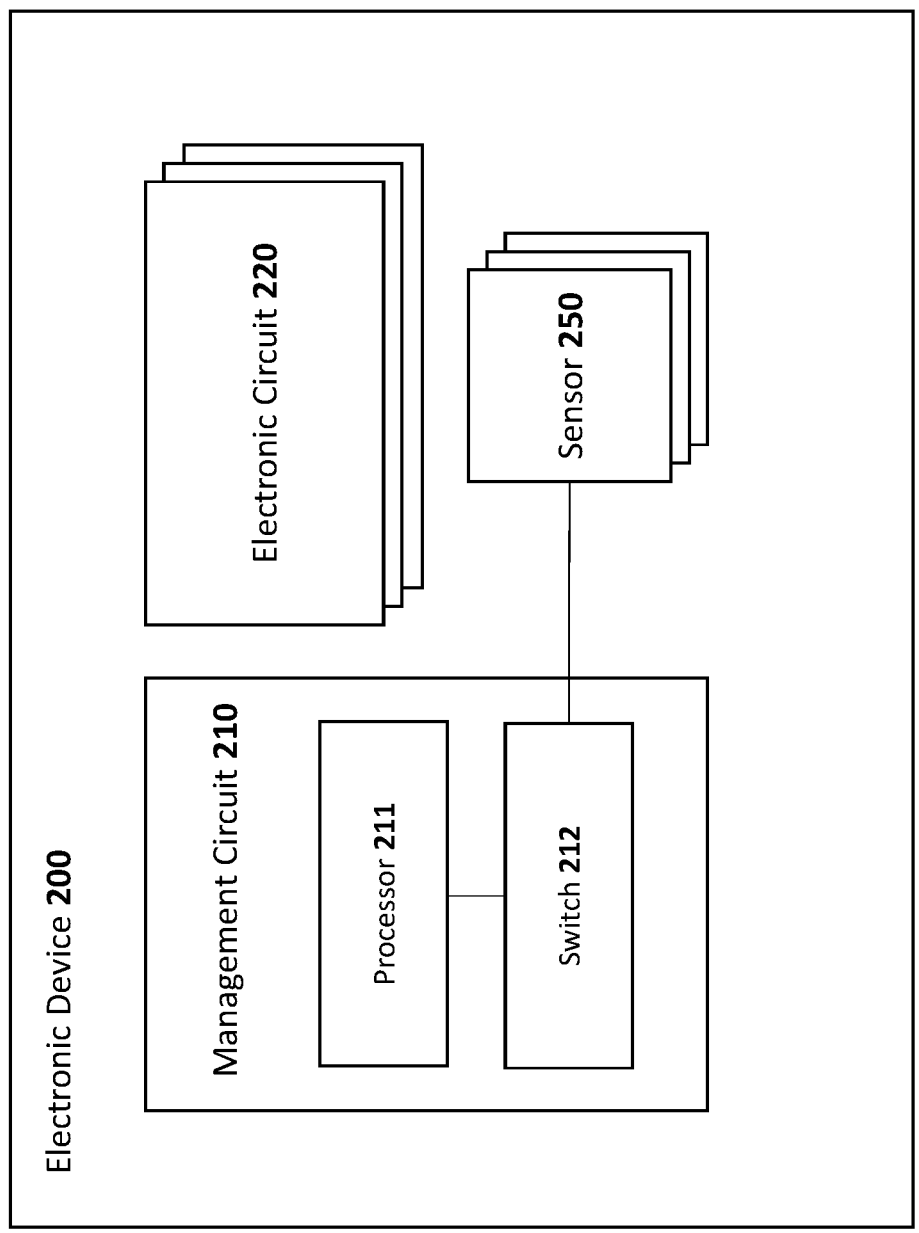
FIG. 2 is a block diagram that illustrates an electronic device of a secure electronic device housing system, according to an embodiment.

FIG. 2 is a block diagram that illustrates an electronic device of a secure electronic device housing system (similar to the secure electronic device housing system 100 shown and described with respect to FIG. 1), according to an embodiment. The electronic device 200 includes a management circuit 210 (e.g., an electronic board with a processing unit), a set of electronic circuits 220 (e.g., an ASIC, an FPGA, and/or the like), and a set of sensors 250 (e.g., a seismic sensor, a thermal sensor, an accelerometer, a gyroscopic sensor, a magnetometer, a proximity sensor, a light sensor, a barometric sensor or an radio frequency (RF) sensor, and/or the like). The set of electronic circuits 220 are separate from and not receiving electrical signals from (e.g., electrically isolated in one direction using a non-reciprocal electrical component such as, for example, a diode). the management circuit 210 and the set of sensors 250.

The management circuit 210 includes a processor 211 (e.g., a CPU, a microcontroller, and/or the like) and a switch 212 (e.g., a sensor aggregation hub). The switch 212 is operatively coupled to the processor 211 and the set of sensors 250. The switch 212 can selectively and operatively couple the processor 211 of the management circuit 210 to a sensor from the set of sensors 250 and not the remaining sensors from the set of sensors 250.

In some implementations, the switch 212 can be implemented as multiple electrical switches. Each electrical switch 212 on one side is uniquely connected to a sensor from the set of sensors 250 and on the other side connected to the processor 211. A first sensor from the set of sensors 250 that is connected to a first electrical switch 212 is separate from and not electrically connected to any of the set of electronic circuits 220, and can measure an out-of-band characteristic (e.g., temperature) of a first electronic circuit from the set of electronic circuits 220. The first electrical switch 212 can operatively couple the first sensor and not the remaining sensors from the set of sensors 250 to the processor 211 of the management circuit 210. A second sensor from the set of sensors 250 that is connected to a second electrical switch 212 is separate from and not electrically connected to any of the set of electronic circuits 220, and can measure an out-of-band characteristic of a second electronic circuit (e.g., proximity to the second electronic circuit) from the set of electronic circuits 220. The second electrical switch 212 can operatively couple the second sensor and not the remaining sensors from the set of sensors 250 to the processor 211 of the management circuit 210.

In some implementation, the switch 212 can be a multiplexer (e.g., an RF multiplexer, an optical multiplexer, and/or the like) that includes a set of ports. Each port uniquely connects each sensor 250 to the processor 211. A first sensor from the set of sensors 250, that is separate from and not electrically connected to any of the set of electronic circuits 220, can measure an out-of-band characteristic (e.g., a vibration) of a first electronic circuit from the set of electronic circuits 220. The multiplexer can operatively couple to the processor 211 of the management circuit 210 the first sensor and not the remaining sensors from the set of sensors 250. A second sensor from the set of sensors 250, that is separate from and not electrically connected to any of the set of electronic circuits 220, can measure an out-of-band characteristic of a second electronic circuit (e.g., light intensity) from the set of electronic circuits 220. The multiplexer can operatively couple to the processor 211 of the management circuit 210 the second sensor and not the remaining sensors from the set of sensors 250.

FIG. 3 is a flowchart of a method 300 for operating a secure electronic device housing system (similar to the secure electronic device housing system 100 shown and described with respect to FIG. 1), according to an embodiment. At 301, a management circuit (similar to the management circuit 130 shown and described with respect to FIG. 1) of the secure electronic device housing system measures, via a sensor disposed within an interior of a housing of the secure electronic device housing system, an out-of-band characteristic of a first electronic circuit from a set of electronic circuits (similar to the set of electronic circuits 140 shown and described with respect to FIG. 1). The set of electronic circuits are disposed within the interior of the housing and include a second electronic circuit. The management circuit does not substantially measure, via the sensor, the out-of-band characteristic of the second electronic circuit. For example, a radio frequency (RF) sensor can be close (e.g., a centimeter) to the first electronic circuit and far (e.g., ten centimeters) from the second electronic circuit. As a result, the sensor measures an out-of-band characteristic (e.g., direct harmonic) of the first electronic circuit and at a first signal strength larger than a second signal strength of an out-of-band characteristic (e.g., direct harmonic) of the second electronic circuit. In some instances, the management circuit can store baseline values of the first signal strength and/or the second signal strength and monitor the first signal strength and the second signal strength for fluctuations. In some instances, when the values of the first signal strength and/or the second signal strength fluctuate more than a permitted fluctuation threshold, the management circuit can generate a warning, turn secure electronic device housing system off, and/or take any other suitable remedial action.

At 302, the management circuit receives from the sensor a sensor signal indicating the out-of-band characteristic of the first electronic circuit. The management circuit does not substantially receive from the sensor the out-of-band characteristic of the second electronic circuit. At 303, the management circuit analyzes (e.g., via a processor of the management circuit, similar to the processor 131 as shown and described with respect to FIG. 1) the out-of-band characteristic of the first electronic circuit to produce an alarm signal. At 304, the management circuit sends the alarm signal (e.g., to the first electronic circuit and/or the set of communication devices 160 as shown and described with respect to FIG. 1) to initiate a remedial action in response to receiving the alarm signal.

In some implementations, the management circuit measures, via a first sensor disposed within the interior of the housing of the secure electronic device, a first out-of-band characteristic of a first electronic circuit that is also disposed within the interior of the housing of the secure electronic device. The management circuit measures, via a second sensor disposed within the interior of the housing of the secure electronic device, a second out-of-band characteristic of a second electronic circuit that is also disposed within the interior of the housing of the secure electronic device. The management circuit receives from the first sensor a first sensor signal indicating the first out-of-band characteristic of the first electronic circuit. The management circuit receives from the second sensor a second sensor signal indicating the second out-of-band characteristic of the second electronic circuit. The management circuit analyzes the first out-of-band characteristic of the first electronic circuit and the second out-of-band characteristic of the second electronic circuit to produce a first alarm signal and a second alarm signal, respectively. The management circuit sends the alarm signal to initiate a remedial action in response to receiving the first alarm signal and/or the second alarm signal.

In some instances, the first sensor (accelerometer) and the second sensor (seismic sensors) can be configured to continuously monitor the first out-of-band characteristic and/or the second out-of-band characteristic of the first electronic circuit and/or the second electronic circuit. The management circuit can be configured to store a range of permitted signal strength values for the first out-of-band characteristic and/or the second out-of-band characteristic. If the management circuit measures a signal strength value for the first out-of-band characteristic and/or the second out-of-band characteristic that is larger than the range of permitted signal strength values, the management circuit can turn off the secure electronic device housing system.

In some implementations, the processor of the management circuit can be configured to analyze a set of out-of-band characteristic of the set of electronic circuits. The processor can implement a set of codes (or a set of instructions or a set of models) stored in a memory of the management circuit (similar to the memory 132 as shown and described with respect to FIG. 1). The set of codes, when executed, detect (or identify) an anomaly in the set of out-of-band characteristic. In some instances, the set of codes generate an anomaly score indicative of a severity degree of the anomaly. If the anomaly score is above a predetermined threshold, the management circuit generates a set of alarm signals and transmits the set of alarm signals to the set of electronic circuits and/or the set of communication devices. The management circuit can further prevent the set of electronic circuits (e.g., selectively prevent a subset of electronic circuits from the set of electronic circuits) from completing a power-on-cycle until a validation check is performed. In some implementations, the validation check can be a validation check performed by a user of the secure electronic device housing system. In some implementations, the validation check can be a validation check performed via a communication device from the set of communication devices. In one example, the communication device can establish a communication between a remote compute device and the secure electronic device housing system to perform the validation check by the remote computer.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, object code, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
a housing for an electronic device, the housing having an interior;
a first electronic circuit of the electronic device and being disposed on a first printed circuit board that is disposed within the interior of the housing;
a second electronic circuit of the electronic device and being disposed on a second printed circuit board that is disposed within the interior of the housing;
a sensor separate from and not electrically connected to the first electronic circuit, the sensor disposed within the interior of the housing, the sensor configured to measure an out-of-band characteristic of the first electronic circuit and not the second electronic circuit; and
a management circuit separate from and not receiving electrical signals from the first electronic circuit, the management circuit disposed within the interior of the housing, the management circuit being disposed on first printed circuit board within the interior of the electronic device, the management circuit configured to receive from the sensor a sensor signal indicating the out-of-band characteristic of the first electronic circuit, the management circuit configured to send an alarm signal based on the out-of-band characteristic of the first electronic circuit.

2. The apparatus of claim 1, wherein:
the management circuit is configured to prevent the first electronic circuit from completing a power-on cycle until the management circuit has performed a validity check based on the out-of-band characteristic of the first electronic circuit.

3. The apparatus of claim 1, wherein the management circuit sends the alarm signal to the first electronic circuit causing the electronic circuit to take a remedial action in response to receiving the alarm signal.

4. The apparatus of claim 1, wherein the management circuit does not send the alarm signal to the first electronic circuit and sends the alarm signal to a communication device outside of the interior of the housing causing the communication device to initiate a remedial action in response to receiving the alarm signal.

5. The apparatus of claim 1, wherein:
the sensor is included within a plurality of sensors disposed within the interior of the housing, each sensor from the plurality of sensors being of a type different from the remaining sensors from the plurality of sensors,
the sensor signal is included within a plurality of sensor signals, each sensor signal from the plurality of sensor signals being uniquely associated with a sensor from the plurality of sensors,
the management circuit configured to receive the plurality of sensor signals from the plurality of sensors, the management circuit configured to send the alarm signal based on the plurality of sensor signals.

6. The apparatus of claim 1, wherein:
the sensor is included within a plurality of sensors disposed within the interior of the housing, each sensor from the plurality of sensors being of a type different from the remaining sensors from the plurality of sensors,
the management circuit includes a processor separate from and not connected to a processor of the electronic circuit, the management circuit further including a switch operatively coupled to the processor of the management circuit and the plurality of sensors, the switch configured to selectively and operatively couple to the processor of the management circuit a sensor from the plurality of sensors and not the remaining sensors from the plurality of sensors.

7. The apparatus of claim 1, wherein the sensor is a first sensor of a first type, the apparatus further comprising:
a second senor of a second type different from the first type,
the management circuit including a processor separate from and not connected to a processor of the first electronic circuit, the management circuit further including a switch operatively coupled to the processor of the management circuit, the first sensor and the second sensor,
the switch configured to selectively and operatively couple the processor of the management circuit to (1) the first sensor at a first time period and not the second sensor at the first time period, and (2) the second sensor at a second time period mutually exclusive from the first time period and not the first sensor at the second time period,
the management circuit configured to receive the sensor signal from the first sensor and a sensor signal from the second sensor, the management circuit configured to send the alarm signal based on the sensor signal from the first sensor and the sensor signal from the second sensor.

8. The apparatus of claim 1, wherein the sensor is included within a plurality of sensors disposed within the interior of the housing, the plurality of sensors including at least two of a seismic sensor, a thermal sensor, an accelerometer, a gyroscopic sensor, a magnetometer, a proximity sensor, a light sensor, a barometric sensor or an radio frequency (RF) sensor.

9. The apparatus of claim 1, wherein:
the sensor is at least one of a seismic sensor, an accelerometer or a gyroscopic sensor,
the out-of-band characteristic of the first electronic circuit is a movement of the electronic device,
the management circuit configured to send the alarm signal to the first electronic circuit to cause the electronic circuit to become inoperative or powered down in response to the alarm signal indicating the movement of the electronic device.

10. The apparatus of claim 1, wherein:
the management circuit configured to not receive a sensor signal indicating the out-of-band characteristic of the second electronic circuit.

11. An apparatus, comprising:
a housing having an interior;
a first electronic circuit disposed on a first printed circuit board that is disposed within the interior of the housing;
a second electronic circuit disposed on a second printed circuit board that is disposed within the interior of the housing and different from the first printed circuit board;
a plurality of sensors separate from and not electrically connected to any of the first electronic circuit and the second electronic circuit, the plurality of sensors disposed within the interior of the housing, the plurality of sensors including a first sensor and a second sensor, the first sensor configured to measure an out-of-band characteristic from a plurality of out-of-band characteristics and of the first electronic circuit and not the second electronic circuit, the second sensor configured to measure an out-of-band characteristic from the plurality of out-of-band characteristics and of the second electronic circuit and not the first electronic circuit; and
a management circuit separate from and not receiving electrical signals from any of the first electronic circuit and the second electronic circuit, the management circuit disposed within the interior of the housing, the management circuit configured to receive from the plurality of sensors a plurality of sensor signals indicating the plurality of out-of-band characteristics of the first electronic circuit, the management circuit configured to send an alarm signal based on the plurality of out-of-band characteristics of the first electronic circuit.

12. The apparatus of claim 11, wherein:
the management circuit is configured to prevent the first electronic circuit from completing a power-on cycle until the management circuit has performed a validity check based on the out-of-band characteristic of the first electronic circuit.

13. The apparatus of claim 11, wherein the management circuit sends the alarm signal to the first electronic circuit causing the first electronic circuit to take a remedial action in response to receiving the alarm signal.

14. The apparatus of claim 11, wherein the management circuit does not send the alarm signal to the first electronic circuit and sends the alarm signal to a communication device outside of the interior of the housing causing the communication device to initiate a remedial action in response to receiving the alarm signal.

15. The apparatus of claim 11, wherein:
each sensor from the plurality of sensors being of a type different from the remaining sensors from the plurality of sensors,
each sensor signal from the plurality of sensor signals being uniquely associated with a sensor from the plurality of sensors,
the management circuit configured to receive the plurality of sensor signals from the plurality of sensors, the management circuit configured to send the alarm signal based on the plurality of sensor signals.

16. The apparatus of claim 11, wherein:
each sensor from the plurality of sensors being of a type different from the remaining sensors from the plurality of sensors,
the management circuit includes a processor separate from and not connected to a processor of the first electronic circuit, the management circuit further including a switch operatively coupled to the processor of the management circuit and the plurality of sensors, the switch configured to selectively and operatively couple to the processor of the management circuit a sensor from the plurality of sensors and not the remaining sensors from the plurality of sensors.

17. The apparatus of claim 11, wherein:
the plurality of sensors include a first sensor and a second sensor,
the management circuit including a processor separate from and not connected to a processor of the first electronic circuit, the management circuit further including a switch operatively coupled to the processor of the management circuit and the plurality of sensors,
the switch configured to selectively and operatively couple to the processor of the management circuit to (1) the first sensor at a first time period and not the second sensor at the first time period, and (2) the second sensor at a second time period mutually exclusive from the first time period and not the first sensor at the second time period,
the plurality of sensor signals including a sensor signal from the first sensor and a sensor signal from the second sensor, the management circuit configured to send the alarm signal based on the sensor signal from the first sensor and the sensor signal from the second sensor.

18. The apparatus of claim 11, wherein the plurality of sensors configured to substantially not measure an out-of-band characteristic of the second electronic circuit, and the management circuit configured to not receive a plurality of sensor signals indicating the out-of-band characteristic of the second electronic circuit.

19. A method, comprising:
measuring, via a sensor disposed within an interior of a housing, an out-of-band characteristic of a first electronic circuit disposed within the interior of the housing and on a first printed circuit board, the sensor not electrically connected to the first electronic circuit;
substantially not measuring, via the sensor, an out-of-band characteristic of a second electronic circuit disposed within the interior of the housing and on a second printed circuit board different from the first printed circuit board;
substantially not receiving, via the sensor, a sensor signal indicating the out-of-band characteristic of the second electronic circuit;
receiving, from the sensor and at a management circuit disposed within the interior of housing, a sensor signal indicating the out-of-band characteristic of the first electronic circuit;
analyzing, at the management circuit, the out-of-band characteristic of the first electronic circuit to produce an alarm signal; and
sending, from the management circuit, the alarm signal to initiate a remedial action in response to receiving the alarm signal.

20. The method of claim 19, wherein the analyzing includes performing a validation check based on the out-of-band characteristic of the first electronic circuit, the method further comprising:
preventing the first electronic circuit from completing at power-on cycle until the validation check is performed.

21. The method of claim 19, wherein:
the sensor is included within a plurality of sensors disposed within the interior of the housing, each sensor from the plurality of sensors being of a type different from the remaining sensors from the plurality of sensors,
selectively switching, at a switch operatively coupled to a processor of the management circuit and the plurality of sensors, to operatively couple to the processor of the management circuit a sensor from the plurality of sensors and not the remaining sensors from the plurality of sensors.

* * * * *